United States Patent [19]
St. Onge

[11] 3,735,834
[45] May 29, 1973

[54] VEHICLE ANTI-THEFT SYSTEM COMBINATION

[75] Inventor: Daniel A. St. Onge, Detroit, Mich.

[73] Assignee: Charles Dale Brothers, Warren, Mich.

[22] Filed: Dec. 27, 1971

[21] Appl. No.: 212,366

[52] U.S. Cl.....................180/112, 303/89, 180/114
[51] Int. Cl..............................................B60r 25/08
[58] Field of Search......................180/82, 103, 111, 180/112, 113; 192/3 H; 303/89, 21 CF; 188/265

[56] References Cited

UNITED STATES PATENTS

| | | |
|---|---|---|
| 3,425,221 | 2/1969 | Canfield..................................303/89 |
| 3,559,755 | 2/1971 | Pond......................................180/114 |
| 3,453,030 | 7/1969 | Cumming................................303/89 |
| 3,410,610 | 11/1968 | Cumming..............................303/89 |
| 1,856,391 | 5/1932 | Keppler..................................180/112 |
| 3,174,502 | 3/1965 | Howarth et al.................180/114 UX |
| 3,233,153 | 2/1966 | Ryan.................................303/21 CF |
| 3,656,574 | 4/1972 | Edwards..................................303/89 |
| 3,694,039 | 9/1972 | Kawabe et al.....................303/21 CF |

*Primary Examiner*—Kenneth H. Betts
*Assistant Examiner*—John McCormack
*Attorney*—William T. Sevald

[57] ABSTRACT

An anti-theft system combination for vehicles, especially trucks and semi-trailers, which includes at least one double brake cylinder having a first compartment for applying the brakes with air-pressure for driving and a second compartment for automatically applying the brakes with spring force in the absence of air pressure when parked; the presence of air-pressure overcoming the spring force to give the first compartment control of brake application; at least one normally closed check valve in the air lines leading from air pressure supply, at least one normally open relief valve in the brake system down stream from said check valves; the check valve and the relief valve being solenoid actuated to their non-normal conditions; wires leading to the solenoid controlling the valves; a self-locking normally open relay in said wires; and a key operated mechanism for closing the relay; the anti-theft system having a driving condition upon connection of air pressure to the air lines and EMF to the wires established by the driver using the key to close the relay whereupon the check valves are open allowing introduction of air pressure into the brake system and the relief valve is closed holding air pressure in the brake system; the anti-theft system having a non-driving condition upon the disconnection of EMF to the relay whereupon it opens and stays open allowing the relief valve to open to vent air pressure in the brake system whereupon the spring force of the air cylinder sets the brakes under spring force preventing movement of the vehicle and the check valve closes preventing the introduction of air pressure to overcome the spring force to release the brakes.

3 Claims, 4 Drawing Figures

PATENTED MAY 29 1973

3,735,834

VEHICLE ANTI-THEFT SYSTEM COMBINATION

This invention relates to a system or combination of devices for automatically setting the vehicle brakes and preventing their release upon parking to reduce the theft of automotive trailers and/or tractors.

Various anti-theft means are known and used to impede the theft of tractors, trailers, and semi-trailers, but they have not proved entirely satisfactory or effective because the thefts have continued and increased, the devices and systems are complicated in design and construction, expensive to manufacture, difficult and expensive to install and maintain, are not automatically activated, are easy and quick to de-activate, require much additional equipment, and do not make maximum use of equipment already on the vehicle.

With the foregoing in view, it is a primary object of the invention to provide an anti-theft system or combination of devices which substantially increases theft difficulties to reduce thefts of tractors, trailers, and semitrailers, which is simple in design and construction, inexpensive to manufacture, easy and inexpensive to install and maintain, is automatically activated, is difficult and time consuming to de-activate without the proper key, requires little additional equipment, and makes maximum use of equipment already on the vehicle.

An object of the invention is to provide at least one double compartment brake cylinder having a first compartment for applying the brakes with air pressure while driving and a second compartment for automatically applying the brakes with spring force in the absence of air pressure when parked, with the presence of air pressure in the brake system for driving overcoming the spring force to give the first compartment control of brake application while driving.

An object of the invention is to provide at least one normally closed check valve in the brake system air lines leading from air pressure supply and at least one normally open pressure relief valve in the brake air pressure system down stream from the check valve.

An object of the invention is to provide solenoids on each valve for actuating and holding each valve in its non-normal position, that is, with the check valve open and the relief valve closed.

An object of the invention is to provide wires leading from electrical supply to the solenoids with a self-locked-in normally open relay in the wires for holding the valves in their non-normal condition when supplied with EMF and when the relay is closed and energized.

An object of the invention is to provide a key operated mechanism for closing the relay whereupon the relay remains closed while energized and until EMF supply is disconnected and upon disconnection the relay opens and remains open leaving the valves in their normal condition until the relay is again closed by the key operated mechanism.

An object of the invention is to provide an anti-theft system which automatically releases the air pressure and applies the brakes of a vehicle with spring force upon the disconnection of EMF thereby preventing movement of the vehicle.

An object of the invention is to provide an anti-theft system which maintains the brakes applied under spring force and blocks release of the brakes by air pressure until EMF is supplied through the relay to move the check valve and the relief valve to their non-normal condition to admit air pressure to and hold it in the brake system.

An object of the invention is to provide a normally open relay controlling the system closeable only by the key operated mechanism by use of a proper key so that the valves cannot be operated to move to their non-normal condition to admit and hold air pressure to release the spring force applying the brakes without a proper key even though air pressure and EMF are connected to the vehicle.

An object of the invention is to provide a normally closed spring pressed lock bolt on the back doors of a semi-trailer which is moved to its open position by the presence of air pressure in the brake system so that the doors are automatically locked when the trailer is parked.

These and other objects of the invention will become apparent by reference to the following description of a system and devices illustrating the invention taken in connection with the accompanying drawing, in which.

Figure 3:
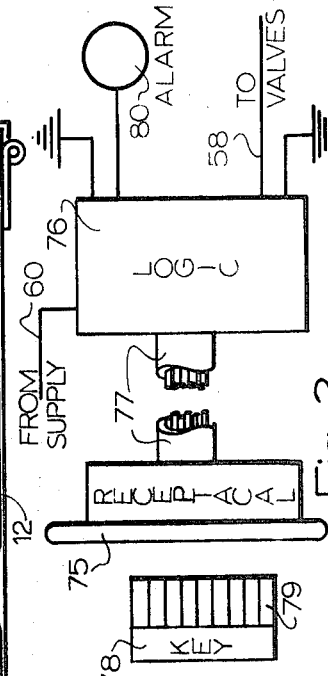
FIG. 3 is a schematic showing of an electrical lock mechanism for controlling the system including an alarm to advise the use of an improper key.

Referring now to the drawing wherein like numerals refer to like and corresponding parts throughout the several views, the semi-trailer system disclosed therein to illustrate the invention is equally applicable to full trailers and tractors and comprises dual axles 10 and 11 having wheels 12. Single chamber or compartment brake cylinders 14 and double chamber or compartment brake cylinders 15 are mounted on each axle 10 and 11. The cylinders 14 and 15 have piston rods 16 and 17 respectively. Brake rods 18 at each wheel 12 have a cam 19 inside the brake drum which forces the brake shoes, not shown, against the brake drum to effect braking. A lever arm 20 between each piston rod 16 and 17 and each brake rod 18, respectively, pivots the brake rods 18 when the piston rods 16 and 17 extend and retract.

The cylinders 14 have an internal diaphragm 22 to extend the piston rods 16 to apply the brakes when air pressure is supplied to them under driver control and have a spring 23 to retract the piston rods 16 when air pressure is released under driver control.

Figure 2:
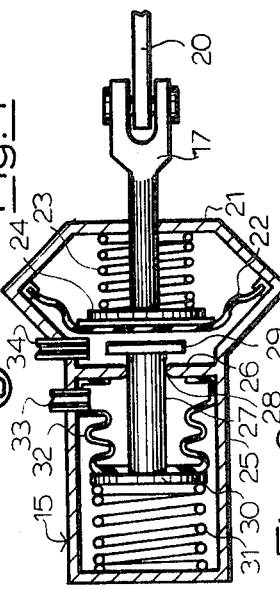
FIG. 2 is an enlarged longitudinal cross-sectional view of a double compartment air brake cylinder having a spring for applying the brakes in the absence of air pressure.

The double compartment cylinders 15 have an end portion 21 similar to the cylinders 14, FIG. 2, including the piston rod 17, lever arm 20, an internal diaphragm 22, a spring 23 to return the piston rod 17, a plate 24 below the piston rod 17, and an air inlet coupling 34 for supplying air pressure to apply the brakes under driver control.

The double compartment cylinders 15 additionally have a base portion 25 sealed from the end portion 21 by the wall 26. A slide rod 27 leads through a seal 28 in the wall 26 to a head 29 in the end portion 21. The head 29 on the slide rod 27 lies below the plate 24 on the piston rod 17. A plate 30 on the bottom of the slide rod 27 is urged by a spring 31 toward the end portion 21. A diaphragm 32 above the plate 30 when under air pressure urges the slide rod 27 and plate 30 against the spring 31. A coupling 33 supplies air pressure to the diaphragm 32 to expand it against the plate 30 to compress the spring 31 and to move the plate 30, slide rod 27, and head 29 away from the piston rod 17 and plate 24. With air pressure supplied to the base portion 25, the head 29 is retracted as shown and is in a neutral position and condition relative to the end portion 21 and piston rod 17. When air pressure is not supplied to the base portion 25, the spring 31 moves the slide rod 27 outwardly and its head 29 contacts the piston base plate 24 and moves the piston rod 17 outwardly to apply the brakes. It will thus be understood that without air pressure to the base portion 25, the brakes are applied and the vehicle cannot be moved until air pressure is re-supplied to the base portion 25 to compress the spring 31 and retract the slide rod 27 and head 29.

A distribution and driver control valve 40 supplies air pressure to the cylinders 14 via lines 41 and 42 and to the end portions 21 of the cylinders 15 via lines 43 and 44.

Lines 50 and 51 furnish air pressure to the control valve 40 from the compressor, not shown, on the vehicle. A reservoir tank 52 is supplied with air pressure by the valve 40 via line 53. The tank 52 supplies air pressure back to the control valve 40 through the line 53 as when pressure supply is not forthcoming in the lines 50 and 51 and as when the compressor and/or other source is inactive.

The tanks 52 supplies air pressure to the base portion 25 of the double cylinders 15 at the coupling 33 via lines 54 and 55. Normally-closed check valves 56 are connected in the lines 50 and 51. A normally open relief valve 57 is connected between the system and atmosphere at air line 54. Solenoids 68 control the check valves 56 and a solenoid 70 controls the relief valve 57. An electric wire 58 leads to the solenoids 68 and 70 on the valves 56 and 57, respectively, and supplies EMF to the solenoids 68 and 70 to open the check valves 56 and to close the relief valve 57. A junction box or shielding 72, indicated in broken lines, contains a relay 69 for completing or opening the circuit in the wire 58. EMF is supplied to the relay 69 by the plug 59 and wire 60. A key operated lock mechanism 61 controls the relay 69 via a mechanical link 62, a cam 63, and the normally open switch 64 in the shut circuit 65 around the relay 69.

When the vehicle is standing parked, it is at atmospheric pressure in all portions of the air system, without EMF supply, with the relay 69 in the junction box "off" and interrupting supply of EMF to the check valves 56, and with the relief valve 57 venting the brake system to atmosphere. Thus the check valves 56 are closed preventing air pressure from being introduced into the brake system; the force of the spring 31 in each double cylinder 15 is not withstood by any air pressure and the spring 31 extends the slide rod 27 and head 29 into contact with the base plate 24 on the piston rod 17 extending it to apply the brakes in the associated wheels 12. Thus air pressure is not furnished to the base portion 25 of the double cylinders 15 and the brakes are applied and the vehicle cannot be moved. The vehicle cannot be moved until air pressure is supplied to the base portion 25 to force the spring 31 back and to retract the slide rod 27 to the position seen in FIG. 2 to release the brakes.

Before air pressure can be supplied to the system, the normally open relief valve 57 must be electrically closed as its outlet is vented to atmosphere at the exhaust port 73. Also no air pressure can be supplied to the brake system or to the tank 52 via the lines 50 and 51 as these lines are blocked by the normally closed check valves 56. Also connecting EMF at the plug 59 will not open the check valves 56 or close the relief valve 57 as the relay 69 in the junction box is open. Thus it is necessary to close the relay 69 as well as supply EMF at the plug 59. But to close the relay 69, the operator must have a key 66 to the lock mechanism 61.

Thus to steal a trailer equipped with the protective system of the invention, the thief must connect air pressure to the lines 50 and 51, connect EMF to the plug 59, have a key 66 to the lock mechanism 61, and close the relay 69 to open the check valves 56 and close the relief valve 57 before he can put air pressure into the system, build pressure to an operative level to counteract spring force applying the brakes, and retain the pressure to keep the brakes released.

The system works automatically upon stopping a vehicle or disconnecting a trailer as the self-holding relay 69 holds itself in the closed position as long as EMF is supplied, automatically opens upon cut-off of EMF, and stays open until its switch 64 is actuated to the close position by the activation of the key controlled lock mechanism 61 again moving it to the self-holding position. Thus upon cutting off EMF supply, as by disconnecting a semi-trailer from a tractor, the mere re-connection of the EMF will not open the check valves 56 or close the relief valve 57 until the relay 69 is closed by the lock mechanism 61 through the key 66.

Also the re-connection of air pressure lines to the trailer will not release the brakes as the normally closed check valves 56 block flow in the lines 50 and 51 to the brake system and in particular to the diaphragm 32 so that the force of the spring 31 cannot be retracted from its braking position.

Figure 1:
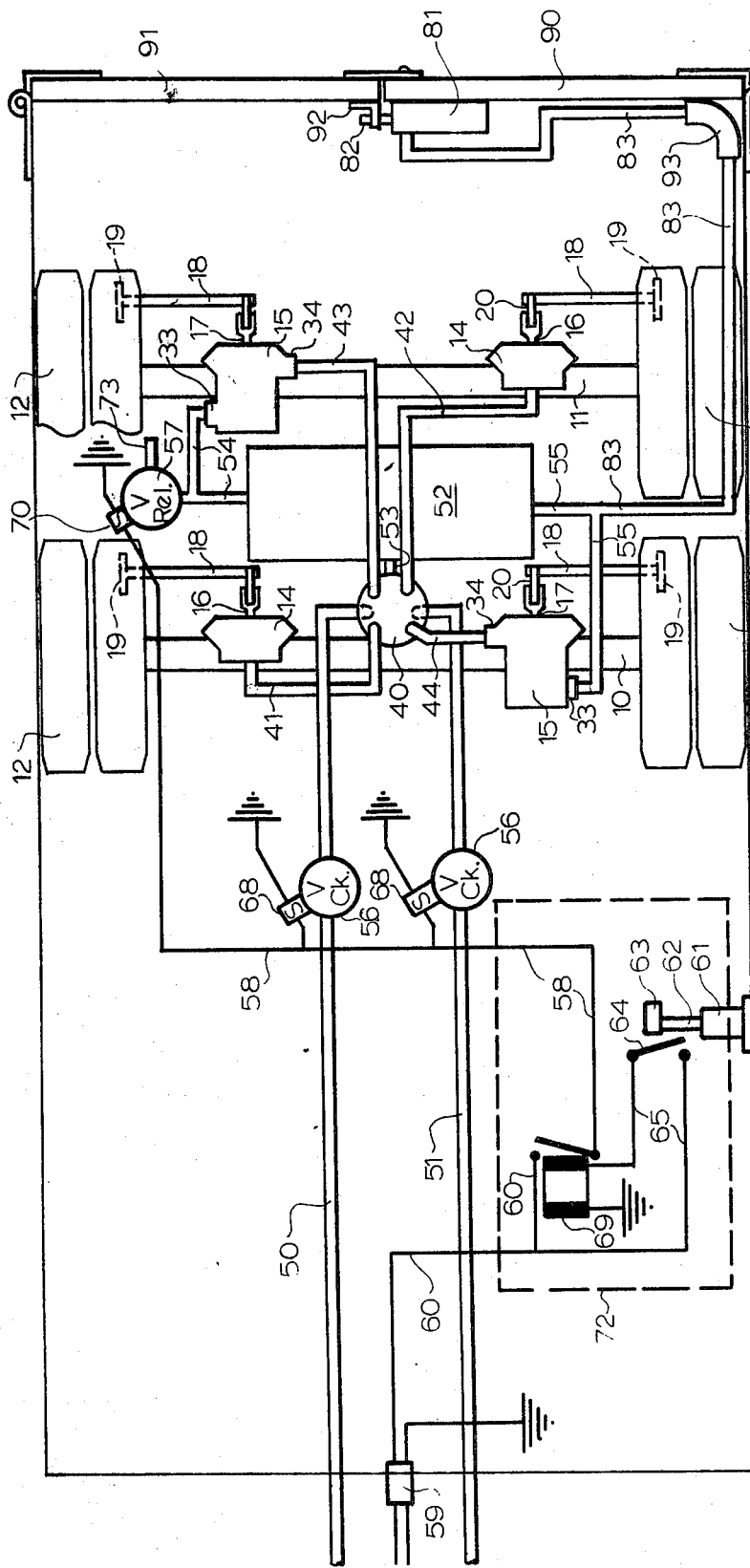
FIG. 1 is a schematic diagram of a braking system including the anti-theft device of the invention as controlled by a mechanical key-operated mechanism and showing the back door lock bolt operated by air pressure.

The electric lock device shown diagrammatically in FIG. 3 may be substituted for the mechanical mechanism seen in FIG. 1. In the electric device of FIG. 3, the receptacle 75 has contacts, not shown, connected to the case 76 via the multi-wire cable 77. The case 76 contains the logic including a relay and a switch as in the mechanical lock mechanism of FIG. 1. A key 78 has contacts 79 and circuits coordinated with the contacts of the receptacle 75 to close circuits in the logic case 76 to close its switch and relay to connect EMF to the wire 58 leading to the solenoids 68 and 70 on the valves 56 and 57, respectively. An electric lock device sold under the trademark "Identi-Lock" by Eaton, Yale & Towne has been found suitable for the purpose. The electric lock device may also include an alarm 80 which is activated by the use of an improper key 78 and the alarm may include a horn, flashing lights, etc., as desired.

Referring now to the back door lock for semi-trailers, a cylinder 81 mounted on the door 90 has a piston rod 82 normally extended by an internal spring as seen in FIG. 1. When the piston rod is extended as shown, it lies in a bracket 92 on the door 91. This locks the doors 90 and 91. An air line 83 leads from the brake system, as at line 55, to the cylinder 81 above its internal piston on the piston rod 82. When air pressure exists in the brake system, it is supplied via the air line 83 to the cylinder 81 and its internal piston moves and compresses its internal spring and withdraws the piston rod 82 from the bracket 92 thus unlocking the back doors 90 and 91. A flexible elbow 93 in the air line 83, as shown, allows opening and closing the door 90. The line 83 also may be flexible in itself and coiled to permit opening and closing of the door 90, as desired.

Figure 4:
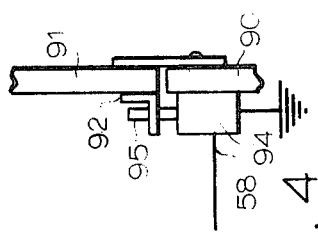
FIG. 4 is a schematic showing of an electrically operated back door lock.

Also an electric lock may be used on the back door and operated by the relay 69 and key 66 without the need for air pressure. The electric back door lock, FIG. 4, includes a case 94 having a normally extended spring pressed bolt 95 engaging the bracket 92 to lock the doors 90 and 91. The case 94 has an internal solenoid which withdraws the bolt 95 when the solenoid is energized. The wire 58 leading from the relay 69 is connected to the solenoid in the case 94. Thus when the relay 69 is closed, the bolt 95 is withdrawn from the bracket 92 and the doors 90 and 91 may be opened. Conversely, when the relay 69 is not energized, the doors 90 and 91 are locked by the bolt. With the electric back door lock, the doors 90 and 91 may be opened by the use of the key and EMF only and there is no need for air pressure.

It will be understood that the electrical system, the check valves 56, relief valve 57, and other parts may be armor covered as with stainless steel tubing to prevent short circuiting by thieves. Also they may be enclosed in the bed and/or frame of the truck or trailer to render access to them very difficult.

The scope of the invention is defined by the appended claims.

I claim:

1. An anti-theft combination for vehicles having an air-brake system including pressure supply lines wherein the brakes of the parked vehicle are applied with spring force to prevent movement of the vehicle, comprising, at least one double compartment brake cylinder having a first compartment for applying the brakes with air pressure for control while driving and a second compartment having a spring for automatically applying the brakes with spring force in the absence of air pressure for holding the vehicle when parked;

said second compartment having a diaphragm compressing said spring to a neutral position when air pressure is present in the brake system;

a normally closed check valve in the air lines leading from pressure supply to said brake cylinder for blocking air pressure supply when parked;

a normally open relief valve in said brake system down stream from said check valve for venting air pressure in the brake system when parked;

a solenoid on each said valve for moving each said valve to its non-normal position when said solenoids are energized;

wires leading to said solenoids for electrically energizing said solenoids;

a normally open relay in said wires normally interrupting EMF supply to said solenoids; said relay being self-holding-in when closed and energized and opening automatically upon de-energizing;

a key operated lock mechanism for closing said relay, and a key for operating said lock mechanism;

the anti-theft system having a driving condition upon connection of air pressure to the air lines and EMF to the wires established by the driver using said key to close said relay whereupon said solenoids are energized and said check valves are open allowing introduction of air pressure into the brake system and said relief valve is closed holding air pressure in the brake system with said diaphragm compressing said spring to a neutral position;

the anti-theft system having a non-driving condition upon the disconnection of EMF to said relay whereupon it opens the stays open de-energizing said solenoids thereby allowing said check valve to close preventing the introduction of air pressure to said diaphragm to release the brakes by compressing said spring to a neutral position, and allowing said relief valve to open to vent air pressure in the brake system including said diaphragm whereupon the spring force of said spring in said air cylinder sets the brakes preventing movement of the vehicle.

2. In a combination as set forth in claim 1, said vehicle having a door; a spring pressed lock bolt normally locking said door when in closed position; an air cylinder having a piston connected to said bolt; and an air line leading to said air cylinder from said brake system;

presence of air pressure in said brake system moving said piston to withdraw said spring pressed lock bolt from its normal position to unlock said door;

absence of air pressure in said brake system allowing said spring pressed lock bolt to move to its normal position to lock said door.

3. In a combination as set forth in claim 1, said vehicle having a door; a spring pressed lock bolt normally locking said door when in closed position; a solenoid connected to said lock bolt, and a wire leading from said relay for energizing said solenoid;

closing said relay energizing said solenoid to withdraw said spring pressed lock bolt from its normal position to unlock said door;

opening said relay de-energizing said solenoid allowing said spring pressed lock bolt to move to its normal position to lock said door.

* * * * *